United States Patent
Braun

(10) Patent No.: US 9,284,991 B2
(45) Date of Patent: Mar. 15, 2016

(54) JOURNAL CROSS OF A UNIVERSAL JOINT

(71) Applicant: Aktiebolaget SKF, Göteborg (SE)

(72) Inventor: Christoph Braun, Bad Königshofen (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/224,128

(22) Filed: Mar. 25, 2014

(65) Prior Publication Data

US 2014/0323233 A1    Oct. 30, 2014

(30) Foreign Application Priority Data

Apr. 25, 2013   (DE) .......................... 10 2013 205 184

(51) Int. Cl.
| | |
|---|---|
| F16D 3/41 | (2006.01) |
| F16D 3/44 | (2006.01) |
| F16D 3/40 | (2006.01) |
| B22F 7/00 | (2006.01) |
| C22C 1/08 | (2006.01) |

(52) U.S. Cl.
CPC . *F16D 3/44* (2013.01); *B22F 7/006* (2013.01); *C22C 1/08* (2013.01); *F16D 3/40* (2013.01)

(58) Field of Classification Search
CPC .............. B22F 7/006; F16D 3/40; F16D 3/44
USPC ............... 464/136, 902, 14; 428/613; 29/888, 29/DIG. 2
See application file for complete search history.

(56) References Cited

U.S. PATENT DOCUMENTS

| | | | | |
|---|---|---|---|---|
| 768,200 | A | * | 8/1904 | Speiers et al. .......... F16C 35/02 464/14 X |
| 3,381,986 | A | | 5/1968 | Seelig |
| 4,795,401 | A | * | 1/1989 | Ende ........................ 464/136 X |
| 6,797,084 | B2 | | 9/2004 | Shuster |
| 7,774,925 | B2 | * | 8/2010 | Tewari et al. |
| 2002/0066254 | A1 | | 6/2002 | Ebbinghaus |

FOREIGN PATENT DOCUMENTS

| | | | |
|---|---|---|---|
| DE | 2403001 | | 10/1974 |
| DE | 10 2005 047 243 A1 | * | 4/2007 |
| GB | 928808 | * | 7/1964 .................... 464/136 |
| GB | 1231499 | | 5/1971 |
| SU | 889936 | * | 12/1981 |

* cited by examiner

*Primary Examiner* — Gregory Binda

(74) *Attorney, Agent, or Firm* — Bryan Peckjian; SKF USA Inc. Patent Dept.

(57) ABSTRACT

A journal cross of a universal joint includes a base body from which four journals extend outwardly, each journal of the four journals having a cylindrical section and an outer diameter and a length in an axial direction of the journal. The four journals are formed as tubular structures, an inner diameter of each of the tubular structures is at least 67% of the outer diameter of each of the tubular structures, the journal cross is formed as a one-piece component from which the four journals as well as the transitions between the four journals are also formed, and the four journals merge in a common cavity which is formed in an interior of the journal cross.

13 Claims, 2 Drawing Sheets

JOURNAL CROSS OF A UNIVERSAL JOINT

CROSS-REFERENCE TO RELATED APPLICATION

This application claims priority to German patent application no. 10 2013 205 184.0 filed on Mar. 25, 2013, the contents of which are fully incorporated herein by reference.

TECHNOLOGICAL FIELD

The disclosure is directed to a journal cross of a universal joint that includes a base body from which four journals extend outwardly. Each of the journals has a cylindrical cross-section, an outer diameter and an axial length. The journals are formed as tubular structures, and the inner diameter of each tubular structure is at least about 67% of the outer diameter of the tubular structure.

BACKGROUND

Universal joints are well known in the prior art, and the central component of such universal joints is a journal cross of the type mentioned above. A journal cross includes four journals, each having a cylindrical surface. The journals are formed on a base body, and each journal is configured to receive a bearing. Both rolling-element bearings (preferably drawn cup needle roller bearings) and sliding bearings can be used with the journals. The journal cross is often formed as a solid part, and small center bores or small bores can be provided for supplying lubricant in the region of the cylindrical section.

A journal cross of the above-described type is known from GB 1231499. Other relevant journal crosses are known from DE 2403001B, U.S. Pat. No. 3,381,986, US 2002/0066254, and U.S. Pat. No. 6,797,084 B2.

Solid journal crosses, and in particular solid cylindrical sections of journal crosses, have some disadvantages. For example, the cylindrical section of the journal cross has hardly any adaptability to deformation-induced deviations from the ideal shape. This can lead to edge wear in the bearing assemblies because when torque is transmitted excessive contact stress arises at the end of the cylindrical section of a journal.

Furthermore, the weight of a solid journal cross also may sometimes be disadvantageous, particularly in applications in the automotive industry (applications in both automobiles and trucks).

SUMMARY

One feature of the present disclosure is to provide a journal cross having an improved adaptability to load-induced deformations and to do so in a relatively simple manner. Furthermore, the weight of the journal cross is reduced without compromising its strength.

Benefits may be obtained by forming a journal cross as a one-piece component, i.e., forming four journals and all their interconnections or transitions as a unitary body, and such that the journals merge into a common cavity which is formed in the interior of the journal cross.

All of the transitions between the journals are thus formed as walls which leave a cavity in the interior of the journal cross. This gives the journal cross a tubular, hollow structure.

Furthermore, the interior of at least one of the journals can be filled with a metal foam for stiffening the journal cross; preferably all of the journals and the cavity are filled with the metal foam. The metal foam is preferably made entirely from aluminum or includes aluminum.

In one preferred embodiment, the journal cross is manufactured using an internal high-pressure forming (IHF) process, preferably using a metal plate part as the starting product of the internal high-pressure forming process.

The journal cross may be used as a component of a drive shaft of a vehicle or in any other environment where universal joints are used.

The disclosure is thus directed to providing a journal cross having tubular journals. With an appropriate design thereof the required strength of the component decreases only slightly, while the adaptability of the journal cross to deformations is simultaneously improved. Edge wear in the bearing assembly can also be reduced or prevented in this way, and local contact pressures can be reduced.

Furthermore the journal cross of this disclosure is substantially lighter than conventional journal crosses, and this may be advantageous, particularly when the journal cross is used in motor vehicles. Motor vehicle drive shafts are relatively heavy components of a vehicle, and weight reductions in the drive shafts are desirable. Drive shafts of commercial vehicles are an especially preferred application for the disclosed journal cross, since the journal crosses used here are often over-dimensioned or oversized. The use of less material to form the journal cross also reduces costs.

In addition to the lighter weight of the disclosed journal cross, the disclosed journal cross has a higher flexibility at the end of each journal. The ends of the journals are where the highest contact stresses arise due to, for example, deformation-induced misalignment during operation. A higher flexibility of the journal end region can reduce or minimize the stresses in the rolling-element contact and thus contribute to a longer service life of the journal cross and the universal joint.

The disclosed journal cross thus comprises a relatively thin-walled metal plate structure and uses only the amount of material necessary. In addition to the advantage of material and weight savings, it further advantageously allows the manufacturing tolerances to be kept small. This may be achieved, for example, by using a hydroforming process.

DETAILED DESCRIPTION

Figure 1:
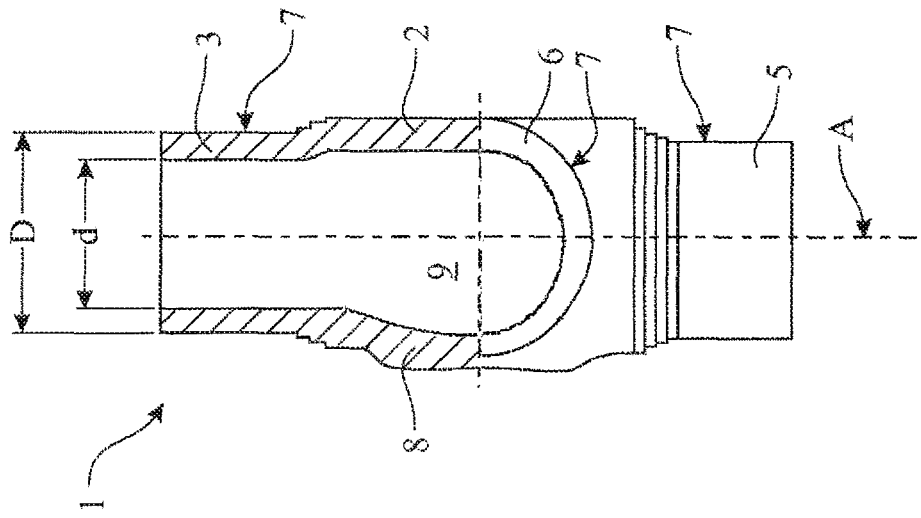
FIG. 1 a front elevational view, partly in section, of a journal cross according to an embodiment.
Figure 2:
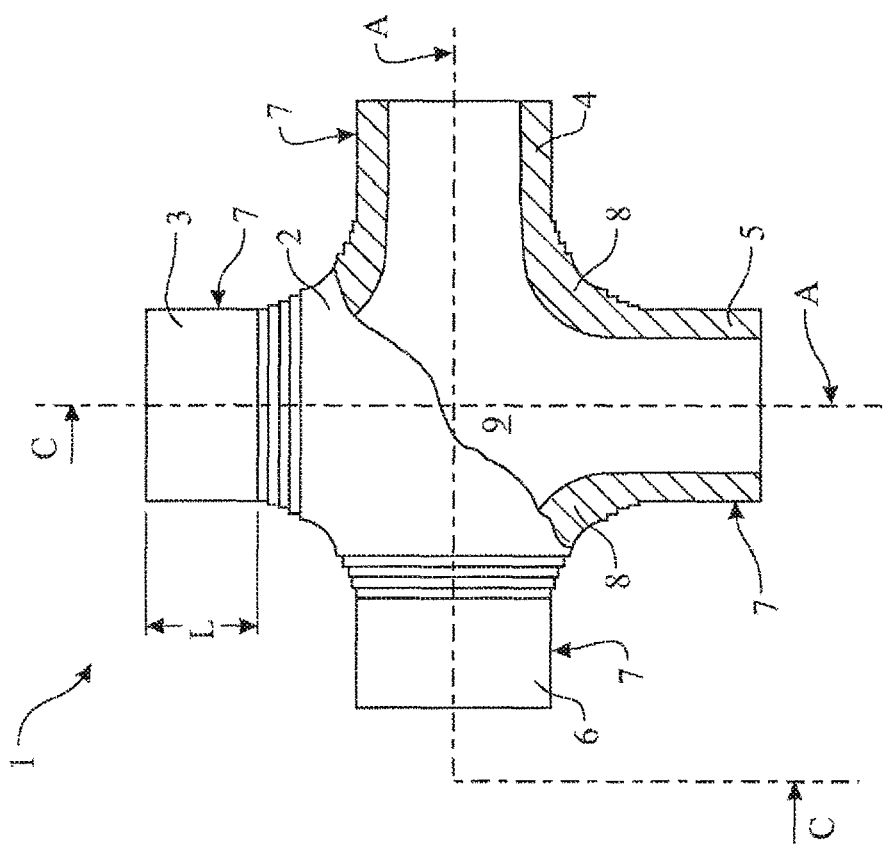
FIG. 2 is a sectional side elevational view taken in the direction of line C-C in FIG. 1.
Figure 4:
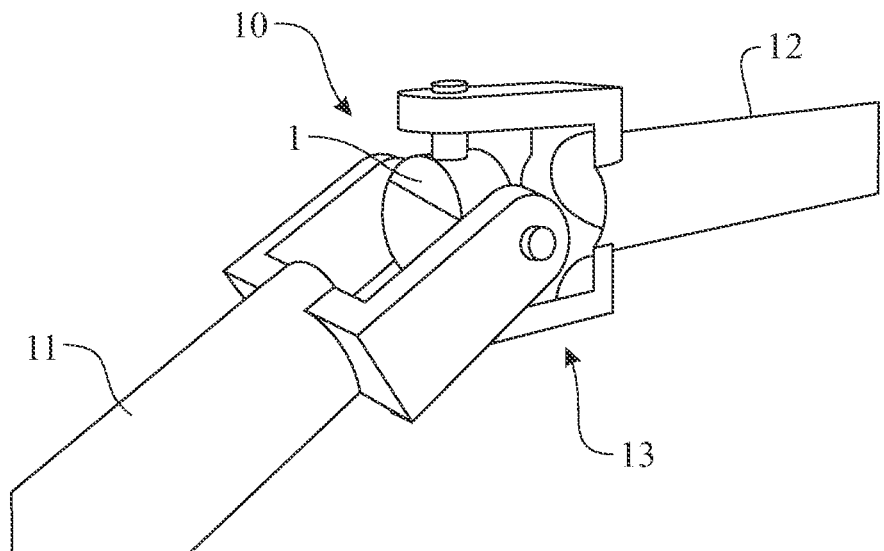
FIG. 4 schematically illustrates a drive shaft that includes a universal joint having a journal cross according to an embodiment.

A journal cross 1 is illustrated in FIGS. 1 and 2 which is suitable for use as a component of a universal joint. For example, FIG. 4 illustrates a universal joint 10 connecting a first shaft member 11 and a second shaft member 12 to form a drive shaft 13. The journal cross 1 forms part of the universal joint 10. The journal cross 1 has a (hollow) base body 2 from which four journals, namely, a first journal 3, a second journal 4, a third journal 5 and a fourth journal 6, extend outwardly.

Each of the first through fourth journals 3, 4, 5, 6 has an axial direction A, and the four axes of the four journals 3, 4, 5, 6 all lie in one plane.

Each of the first through fourth journals 3, 4, 5, 6 has a cylindrical section 7 which is characterized by an outer diameter D and a length L in the axial direction A. The cylindrical section 7 serves, with its outer circumferential surface, as an abutment for needle rollers of a drawn cap needle roller bearing. The roller bearing in turn supports the journal cross on its surrounding components. Alternately, the cylindrical sections 7 can be used for sliding supporting (e.g., as a slide bearing) of the journal cross 1 on its surrounding components.

It is significant that the cylindrical sections 7 are not solid, but rather are tubular and have hollow interiors. Accordingly each of the first through fourth journals 3, 4, 5, 6 has an inner diameter d (see FIG. 2) which, together with the outer diameter D and the length L, defines the geometry of the tubular journal. Here the inner diameter d is at least 50% of the outer diameter D, and more preferably at least 67% of the outer diameter D, so that a substantially lighter construction results in comparison with a solid journal cross.

As is clear from the illustrated cut-out regions of the journal cross 1, the transition 8 between the individual first through fourth journals 3, 4, 5, 6 is also formed as a shell-like or hollow structure. The wall thickness in this region can be somewhat thicker than in the region of the of the first through fourth journals 3, 4, 5, 6. A cavity 9 thus results in the center of the journal cross 1.

Figure 3:
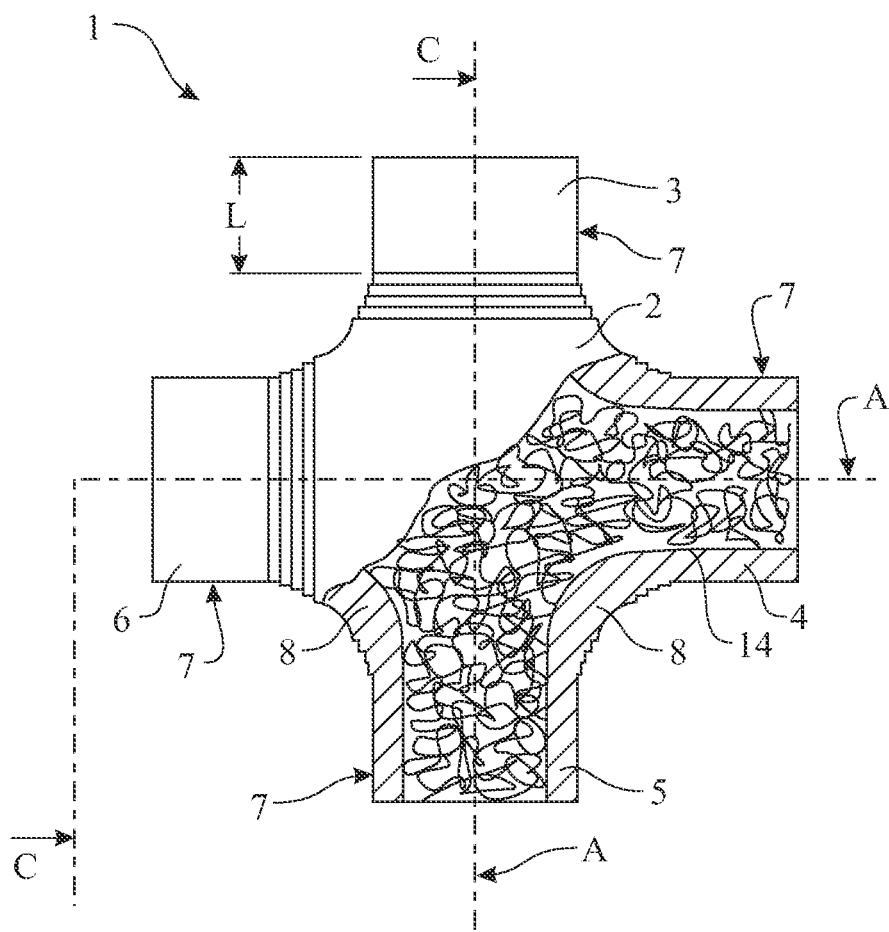
FIG. 3 is a front elevational view, partly in section, of a journal cross according to another embodiment, which journal cross is filled with a metal foam.

For stiffening the journal cross, the cavity 9 and/or the interior of the tubular structures of the first through fourth journals 3, 4, 5, 6, can be filled with a suitable metal foam. FIG. 3 illustrates an embodiment that includes a metal foam 14. As will be recognized by those of ordinary skill in the art, a metal foam is body of metal, for example, aluminum, containing numerous gas-filled pores. The pores may comprise sealed cells to produce a closed-cell foam, or they may be interconnected and form an open-cell foam. Typically 75-95% of the volume of metal foams are empty space, and this makes metal foams significantly less dense than the metals from which they are formed. Metal foams, including aluminum metal foams, are available from various suppliers including, for example, Erg Materials & Aerospace Corporation of Emeryville, Calif. Adding a metal foam thus increases the weight of the journal cross only slightly, but results in a much more rigid structure.

An internal high-pressure forming process (also called "hydroforming") is preferably used for manufacturing the journal cross. In this process, a metallic tube structure is placed in a closed mold under high pressure using, for example, a water-oil emulsion, so that the material of the starting product conforms to the walls of the mold and is deformed into a desired shape. The internal pressure is a significant process parameter here, and with series production should usually be up to 3,000 bar.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide an improved journal cross.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Journal cross
2 Base body
3 First journal
4 Second journal
5 Third journal
6 Fourth journal
7 Cylindrical section
8 Transition
9 Cavity
10 Universal Joint
11 First shaft member
12 Second shaft member
13 Drive shaft
14 Metal foam
D Diameter
d Diameter
L Length
A Axial direction of the journal

The invention claimed is:

1. A journal cross of a universal joint comprising:
a base body from which four journals extend outwardly, each journal of the four journals having a cylindrical section and an outer diameter and a length in an axial direction of the journal,
wherein the four journals are formed as tubular structures,
wherein an inner diameter of each of the tubular structures is at least 67% of the outer diameter of each of the tubular structures,
wherein the outer diameter and the inner diameter for each journal are centered about a common axis,
wherein the journal cross is formed as a one-piece component from which the four journals as well as the transitions between the four journals are also formed,
wherein the four journals merge in a common cavity which is formed in an interior of the journal cross, and
wherein the interior of at least one of the tubular structures is filled with a metal foam.

2. The journal cross according to claim 1, wherein the interior of all four of the tubular structures and the cavity are filled with the metal foam.

3. The journal cross according to claim 1, wherein the metal foam comprises aluminum.

4. The journal cross according to claim 1, wherein the journal cross is manufactured using an internal high-pressure forming process.

5. The journal cross according to claim 4, wherein the journal cross is manufactured from a metal plate part as the starting product of the internal high-pressure forming process.

6. The journal cross according to claim 1, wherein the journal cross is a component of a drive shaft of a vehicle.

7. A universal joint including the journal cross of claim 1.

8. A journal cross for a universal joint comprising:
a base body having a hollow interior; and
first, second, third and fourth journals integrally formed with and extending outwardly from the base body, each of the first, second, third and fourth journals including a hollow cylindrical portion having an interior, an axial length, an outer diameter and an inner diameter, the inner diameter being at least 67% of the outer diameter,
wherein the outer diameter and the inner diameter for each journal are centered about a common axis,
wherein the hollow interior of the base body communicates with the interior of each of the first, second, third and fourth journals, and
wherein the interior of at least one of the tubular structures is filled with a metal foam.

9. A universal joint including the journal cross of claim 8.

10. The journal cross according to claim 8, wherein the interiors of the first, second, third and fourth journals and the hollow interior of the base body are filled with a metal foam.

11. A universal joint comprising the journal cross of claim 10.

12. A vehicle drive shaft comprising:
a first shaft member connected to a second shaft member at a universal joint,
wherein the universal joint includes the journal cross according to claim 8.

13. A vehicle drive shaft comprising:
a first shaft member connected to a second shaft member at a universal joint,
wherein the universal joint includes the journal cross according to claim 10.

* * * * *